United States Patent
Iizuka

(12) 
(10) Patent No.: US 6,208,613 B1
(45) Date of Patent: Mar. 27, 2001

(54) DISK PLAYER WITH DISK CHUCKING DEVICE

(75) Inventor: Genichi Iizuka, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/286,755

(22) Filed: Apr. 6, 1999

(30) Foreign Application Priority Data

Apr. 9, 1998 (JP) .................................................. 10-097443

(51) Int. Cl.[7] ............................. G11B 23/00; G11B 25/00
(52) U.S. Cl. .......................................................... 369/271
(58) Field of Search .................................. 369/271, 270; 360/99.12

(56) References Cited

U.S. PATENT DOCUMENTS

| | | | | |
|---|---|---|---|---|
| 3,871,663 | * | 3/1975 | Stave ..................... | 369/270 |
| 5,014,143 | * | 5/1991 | Mori et al. ............. | 360/99.12 |
| 5,166,920 | * | 11/1992 | Kogure ................. | 369/270 |
| 5,774,445 | * | 6/1998 | Sawi et al. ........... | 369/270 |
| 5,799,006 | * | 8/1998 | Mukawa ............... | 369/270 |

FOREIGN PATENT DOCUMENTS 62-34353 * 2/1987 (JP) .

* cited by examiner

*Primary Examiner*—George J. Letscher
*Assistant Examiner*—Julie Anne Watko
(74) *Attorney, Agent, or Firm*—Jay H. Maioli

(57) ABSTRACT

A disk chucking device for use in a disk player, in which the supporting shafts of clamping members are held in holding portions of a hinge provided on the top-surface side of a turntable in such a manner as to be coaxial with a cylinder and to slide along therewith, so that each of the supporting shafts is in opposed contact with the inner side surface of a center boss and a corresponding cam provided thereabove. Moreover, the clamping members, each of which has a chuck end portion formed on the top end thereof, are adapted to be able to vertically slide and radially swing. The clamping members are pushed by first and second spring members in the downward direction and in the direction of the outer circumference of a disk. When a disk installed in the device is detached therefrom, the clamping members are raised. Pins attached to the clamping members abut against the cams provided in the center boss. Then, the clamping members are inwardly tilted. Thus, the disk is detached from the device. Subsequently, the clamping members automatically return to initial positions thereof.

19 Claims, 10 Drawing Sheets

DISK PLAYER WITH DISK CHUCKING DEVICE

BACKGROUND OF THE INVENTION

1. Field of the Invention

The present invention generally relates to a disk chucking device for chucking a disk placed on a turntable of a disk player such as an optical disk player or a magnetooptical disk player. More particularly, the present invention relates to a disk chucking device suitable for reducing the thickness of the disk player.

2. Description of the Related Art

Hitherto, a disk chucking device illustrated in, for example, FIGS. 5, 6A and 6B has been used for chucking an optical disk, such as a compact disk (trade name), on a turntable.

As shown in FIG. 5, this chucking device 10 has a center boss 12 that is disposed above a turntable 11 in such a manner as to be coaxial therewith. Three pressing pieces 13 and three steel balls 14 are disposed under this center boss 12. Each of the pressing pieces 13 and the steel balls 14 is partly exposed therefrom. The pressing pieces 13 are arranged at an angular interval of 120°, and the steel balls 14 are arranged at the same angular interval.

Further, the chucking device 10 is connected to a spindle motor 1 mounted on a chassis (not shown), and is driven by the motor 1 to rotate.

As illustrated in FIGS. 6A and 6B, an O-shaped ring (hereunder referred to as an O-ring) 16 made of an elastic material is mounted on the outer surface of a sleeve 15 coaxially connected to a central portion in the center boss 12. This O-ring 16 outwardly pushes the pressing pieces 13 and the steel balls 14 (namely, in the directions of arrows a and b shown in FIGS. 6A and 6B).

Further, each of the pressing pieces 13 is connected to the bottom portion of a corresponding sleeve 15 through a corresponding elastic piece 13s formed on the bottom portion thereof.

In the case of the aforementioned chucking device 10, when a disk D, whose central hole has engaged the center boss 12 as shown in FIG. 6A, is downwardly moved, the pressing pieces 13 inwardly move (namely, in the direction of an arrow a'). Thus, the inner edge of the central hole of the disk D is pressed outwardly (namely, in the direction of the arrow a) by an elastic restoring force of the O-ring 16. Consequently, the disk D is centered on the turntable 11.

Further, when the disk D is downwardly moved, the inner edge of the central hole of the disk D surmounts the steel balls 14 pushed outwardly (namely, in the direction of the arrow b) by the O-ring 16, as illustrated in FIG. 6B. The steel balls 14 push down the inner edge portion of the disk D (in the direction of an arrow C), so that the disk D is caught on the balls 14 and held by the turntable 11.

Namely, the chucking of the disk D is performed by the steel balls 14.

The steel balls 14, however, push the inner edge portion of the disk D from an upwardly slanting direction, as illustrated in FIG. 6B. Thus, the aforementioned conventional chucking device 10 has drawbacks in that the pressing forces of the steel balls 14 against the disk D vary with the shape of the chamfered inner edge thereof and that the adjustment of the pressing forces is difficult.

Moreover, the disk D is installed therein against the pressing forces of the steel balls 14. Thus, the conventional disk chucking device 10 has another drawback in that, if the pressing forces of the steel balls 14 against the disk D are increased, a large force is needed when the disk D is inserted thereinto or removed therefrom.

To eliminate this drawback, there has been proposed a disk chucking device adapted to optionally set a clamping force by pressing down the edge portion of the central hole of a disk at an end of a clamping lever pushed by a tension spring.

(Configuration of the Proposed Disk Chuck Device)

As shown in FIG. 7, this proposed disk chucking device 20A comprises a turntable 21A, a center boss 31C coaxially engaging therewith, and holding members 71 each of which includes a Γ-shaped clamping member 61 for chucking a disk and which accommodates and holds this clamping member 61.

Three notches (or openings) 22 are disposed at an angular interval of 120° in an intervening portion between the outer and inner edges of the turntable 21A. A cylinder 23 is disposed in a central portion of the turntable 21A. Further, three catching bosses 29 are disposed on the bottom side of the turntable 21A at an angular interval of 120° so that each of the catching bosses 29 is aligned with a corresponding one of the openings 22.

Three notches (or openings) 32 are arranged at an angular interval of 120° in the center boss 31C, which engages the cylinder 23, in such a manner that each of the openings 32 is aligned with a corresponding one of the openings 22 of the turntable 21A. Each of three projection pieces 33 for centering a disk D is disposed between a corresponding pair of the openings 32.

In this proposed device, a cam 34 is provided on the inner surface of each of the openings 32 of the center boss 31C in such a manner as to be in opposed contact with a pin 64 of a corresponding one of the clamping members 61, as will be described later.

A chuck end portion 62 for chucking a disk is formed at the top portion of each of the clamping members 61 in such a manner as to project in the direction of the outer circumference of the turntable 21A and as to have upper and lower inclined surfaces. The pin 64 is disposed under this chucking portion 62. Further, a supporting shaft 63 is disposed at the bottom portion of each of the clamping members 61.

Each of the clamping members 61 is coupled to a corresponding one of the catching bosses 29 through a tension spring 66 and is inserted into a corresponding one of the holding members 71 provided on the bottom side of the turntable 21A.

The holding members 71 are mounted on the side surface of the cylinder 23 at an angular interval of 120° so that each of the members 71 is aligned with and partly exposed from a corresponding one of the openings 22 of the turntable 21A.

Further, each of the clamping members 61 respectively inserted into the holding members 71 is disposed in such a way as to be able to be partly exposed from a corresponding one of the openings 32 of the center boss 31C.

Incidentally, the chucking device 20A illustrated in FIG. 7 is connected to the spindle motor 1 mounted on the chassis (not shown), and is driven by the motor 1 to rotate.

With the aforesaid configuration, the proposed chucking device 20A is adapted so that, when no disk is installed therein, the chuck end portion 62 of each of the clamping members 61 is exposed from the corresponding opening 32 of the center boss 31C in the direction of the outer periphery of the turntable 21A, as illustrated in FIG. 8A.

Further, each of the clamping members 61 is pushed downwardly (namely, in the direction of an arrow d shown in FIG. 8A) by the resilient force of the corresponding tension spring 66 stretched between the corresponding one of the catching bosses 29 provided on the bottom side of the turntable 21A and a catching hole 65 of a corresponding one of the clamping members 61. The corresponding supporting shaft 63 abuts against the bottom end of a guide groove 75 of a corresponding one of the holding members 71. The corresponding one of the clamping members 61 is pushed clockwise (namely, in the direction of an arrow e), so that the corresponding pin 64 abuts against the catching portion 73 of the corresponding holding member 71.

Incidentally, in FIGS. 8A to 8C and 9A to 9C, the supporting shaft 63 of the corresponding clamping member 61 is denoted by a mark "+" indicating the center of rotation. The pin 64 is designated by a mark "×" indicating that the pin 64 is movable.

Further, for simplicity of drawing, only parts needed for describing the displacement of the clamping member 61 are denoted by reference characters in FIGS. 8B, 8C, 9B and 9C.

As illustrated in FIG. 8B, when a disk D is installed therein, the inner edge portion thereof pushes the top surface 62A of the chuck end portion 62 of each of the clamping members 61 in the inner circumference of the turntable 21A with the descent of the disk D (in the direction of the arrow d). Thus, each of the clamping members 61 is turned counterclockwise as viewed in this figure, so that each of the pins 64 is detached from the catching portion 73 of the corresponding holding member 71.

In a state of the device illustrated in FIG. 8B, each of the clamping members 61 remains pushed downwardly by the elastic force of the corresponding tension spring 66. Thus, the corresponding supporting shaft 63 abuts against the bottom end of the guide groove 75 of the corresponding holding member 71.

This state lasts until the disk D descends still more to a position where the inner edge of the top surface thereof surmounts the edge of the chuck end portion 62 of each of the clamping members 61.

Then, as illustrated in FIG. 8C, when the disk D descends still more and the disk D is put on the turntable 21A, the top surface of the disk D abuts against the inclined lower surface 62B of each of the clamping members 61.

In a state illustrated in FIG. 8C, each of the clamping members 61 remains pushed downwardly by the resilient force of the corresponding tension spring 66. Thus, the corresponding supporting shaft 63 abuts against the bottom end of the guide groove 75 of the corresponding holding member 71. Moreover, the supporting shaft 63 is pushed counterclockwise as viewed in this figure, so that the corresponding pin 64 abuts against the catching portion 73 of the corresponding holding member 71 again.

Thus, the inclined lower surface of the chuck end portion 62 of each of the clamping members 61 abuts against the inner edge portion of the disk D from above and pushes and clamps the disk D. Namely, the disk D is chucked.

Therefore, the setting of the elastic force of the tension springs 66 ensures a stable pressing force of each of the clamping members 61 when a disk D is installed in this proposed chucking device 20A.

Moreover, the relatively simple structure of each of the clamping members 61 and the holding members 71 results in decrease in the cost of components and in the number of man-hours to fabricate the device 20A.

Additionally, the supporting shaft 63 of each of the clamping members 61 is vertically rockably held in the guide groove 75 of the corresponding holding member 71. Thus, even when, for instance, a mechanical shock causes the disk D to move in the direction in which the chuck end portion 62 of each of the clamping members 61 engages therewith, the chuck end portion 62 thereof rises with the result that the pressing force against the disk D is constant.

In the case that a disk D is released from the chucking device 20A which is in the state where the disk is chucked as illustrated in FIGS. 8C and 9A, the bottom surface 62B of the chuck end portion 62 of each of the clamping members 61 is upwardly pushed by the inner edge of the top surface of the disk D with ascent thereof.

Further, as illustrated in FIG. 9B, each of the clamping members 61 is raised against the resilient force of the tension springs 66. The supporting shaft 63 thereof upwardly slides in the guide groove 75 of the corresponding holding member 71. Moreover, the pin 64 of each of the clamping members 61 is detached from the catching portion 73 of the corresponding holding member 71 and then abuts against the inner slope of the corresponding cam 34 of the center boss 32.

In the state of the device illustrated in FIG. 9B, the pin 64 of each of the clamping members 61 slides on the inner slope of the corresponding cam 34 of the center boss 32. Thus, each of the clamping members 61 rotates counterclockwise, as viewed in this figure.

The amount of rotation of each of the clamping members 61 reaches a maximum value when the disk D rises still more to a position where the inner edge of the top surface thereof surmounts the edge of the chuck end portion 62 thereof, as illustrated in FIG. 9C.

In the state of the device illustrated in FIGS. 9B and 9C, the chuck end portion 62 of each of the clamping members 61 is upwardly exposed from the corresponding opening 32 of the center boss 31C.

When the disk D rises still more from the position thereof shown in FIG. 9C to a position where the inner edge of the bottom surface thereof abuts against the top surface of the chuck end portion 62 of each of the clamping members 61, the engagement of the disk D with the chucking portion 62 is canceled.

Then, the supporting shaft 63 of each of the clamping members 61 downwardly slides in the guide groove 75 of the corresponding holding member 71 and finally abuts against the bottom end thereof because the clamping members 61 are pushed clockwise (namely, in the direction of the arrow e) and downwardly (namely, in the direction of the arrow d) by the resilient force of the tension springs 66. Moreover, each of the pins 64 abuts against the catching portion 73 of the corresponding holding member 71 again. Thus, the device 20A automatically returns to the initial state where no disk is installed therein as illustrated in FIG. 8A.

The aforementioned chucking device 20A, however, cannot be applied to a slim disk apparatus, because the holding members 71 are placed under the turntable 21A, as shown in FIGS. 7 to 9C.

SUMMARY OF THE INVENTION

Accordingly, an object of the present invention is to provide a disk chucking device which can stably ensure the pressing forces of clamping members when a disk is installed therein, and which has a simple configuration and can be easily reduced in thickness.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which.

DESCRIPTION OF THE PREFERRED EMBODIMENT

Hereinafter, a disk chucking device embodying the present invention will be described in detail by referring to FIGS. 1 to 4B.

(Configuration of Embodiment)

Figure 1:
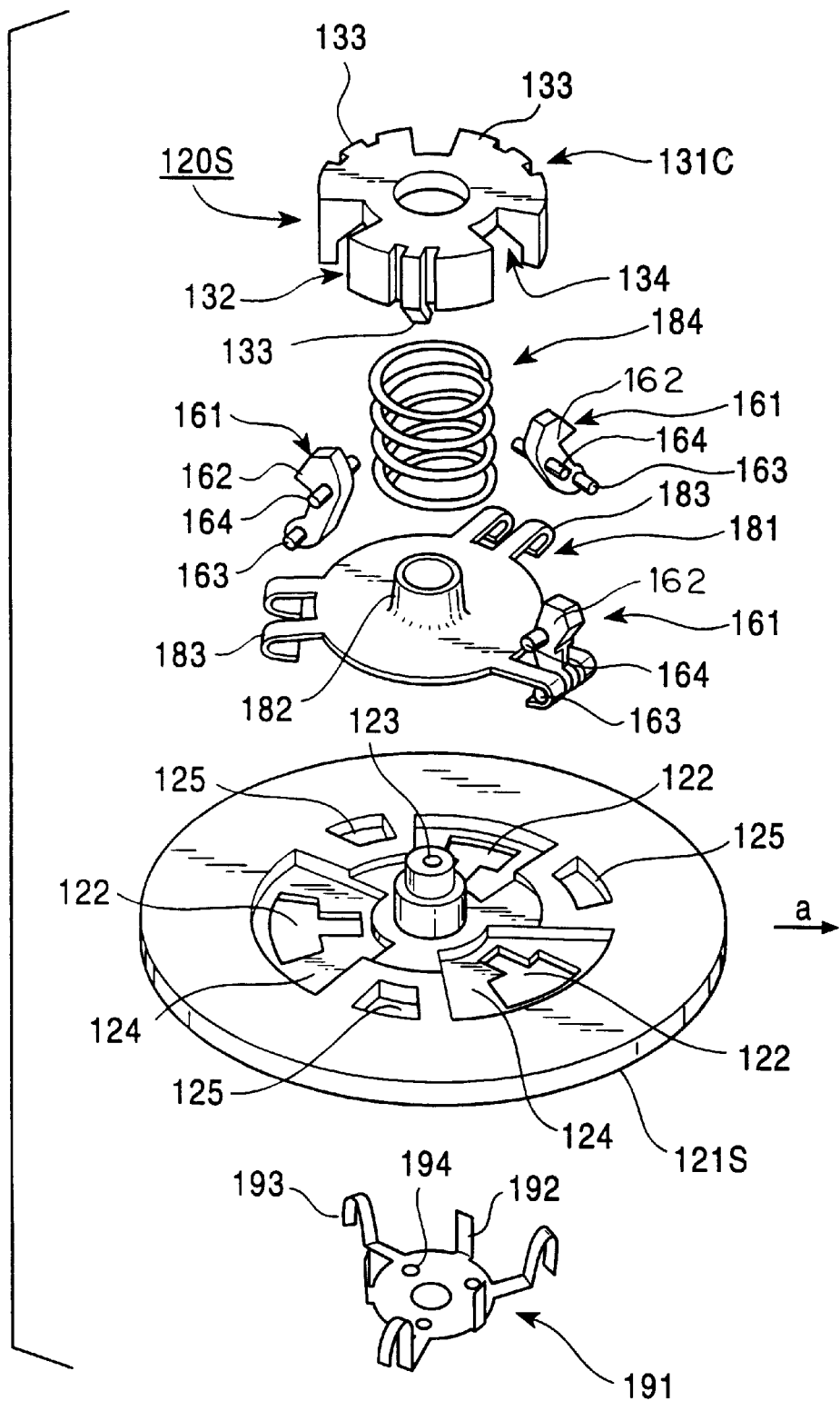
FIG. 1 is a diagram showing the configuration of a disk chucking device embodying the present invention.

FIG. 1 shows the configuration of this embodiment of the present invention. Incidentally, the disk chucking device of the present invention is used in a disk recording/reproducing apparatus (not shown), such as an optical disk player or a magneto-optical disk player.

As shown in FIG. 1, the disk chucking device 120S comprises a turntable 121S, a center boss 131C coaxially engaging therewith, clamping members 161 each shaped like a chevron, a hinge member 181 for holding the clamping members 161, and a plate spring member 191.

Three T-shaped notches (or openings) 122 are placed in an intervening portion between the outer and inner edges of the turntable 121S at an angular interval of 120°. A cylinder 123 is disposed in the central portion of the turntable 121S. Further, a fan-shaped concave portion 124 is formed around each of the three openings 122. Three openings 125 are provided at an angular interval of 120° in the turntable 121S. Each of the openings 125 is disposed between corresponding adjacent two of the concave portions 124.

Three notches (or openings) 132 are placed in the center boss 131C engaging with the cylinder 123 at an angular interval of 120° so that each of the openings 132 is aligned with a corresponding one of the openings 122 formed in the turntable 121S. Each of three projection pieces 133 for centering a disk D is provided between corresponding adjacent two of the openings 132.

In this embodiment, a cam 134 is provided on the inner surface of each of the openings 132 of the center boss 131C.

Further, as will be described later, the cam 134 is in opposed contact with a pin 164 of the corresponding clamping member 161 when a disk is detached from the chucking device 120S.

A chuck end portion 162 for chucking a disk is formed at the top portion of each of the clamping members 161 in such a manner as to project in the direction of the outer circumference of the turntable 121S and has upper and lower inclined surfaces thereof. A pin 164 is disposed under each of the chuck end portions 162. A supporting shaft 163 is disposed at the bottom portion of each of the clamping members 161.

Further, the circular hinge member 181 has a cylindrical portion 182 in the central portion thereof, and slidably engages the cylinder 123. Three sets of holding portions 183 are formed along the edge of the hinge member 181 at an angular interval of 120°. Each of the holding portions 183 consists of two U-shaped bent pieces. The supporting shaft 163 of each of the clamping members 161 is rotatably held by the bent pieces of a corresponding one of the holding portions 183.

Further, in another embodiment which is not shown, it is possible that the circular hinge member 181 and the clamping members 161 are composed as a unit member.

Furthermore, each of the clamping members 161 is disposed in such a way as to be able to be partially exposed from the corresponding opening 132 provided in the center boss 131C.

Additionally, a compression coil spring 184 for obtaining the pressing forces of the clamping members 161 is placed between the center boss 131C and the cylindrical portion 182 of the hinge member 181 in such a way as to be coaxial with the cylindrical portion 182.

On the other hand, the plate spring member 191 is disposed under the turntable 121S. Three L-shaped elastic pieces 192 are formed along the edge of this plate spring member 191 at an angular interval of 120°. Each of three J-shaped elastic pieces 193 is formed between corresponding two of the adjacent L-shaped elastic pieces 192.

The plate spring member 191 is attached to the bottom side of the turntable 121S by thermal fusion utilizing small holes 194 provided therein. Then, each of the L-shaped elastic pieces 192 penetrates through a corresponding one of the openings 122 provided in the turntable 121S and is in opposed contact with the inner surface of a corresponding one of the clamping members 161. Each of the J-shaped elastic pieces 193 penetrates through a corresponding one of the openings 125 provided in the turntable 121S and is in opposed contact with the inner surface of the corresponding projection piece 133 of the center boss 131C. Thus, an outward radial resilient force is imparted to each of the L-shaped elastic pieces 192 and the J-shaped elastic pieces 193.

Incidentally, the chucking device 120S is connected to a spindle motor (not shown) mounted on a chassis (not shown) to which the cylinder 123 is fitted, and is driven by the motor 1 to rotate.

(Chucking Mechanism of Embodiment)

Next, a chucking mechanism of this embodiment of the present invention will be described hereinbelow with reference to FIGS. 2A to 4B.

Figure 2A:
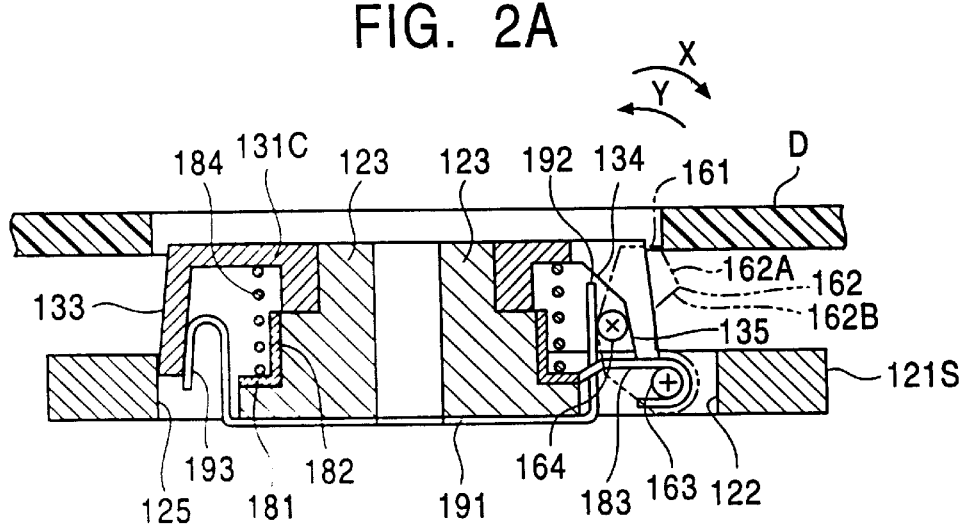
FIGS. 2A to 2C are sectional diagrams illustrating an operation of installing a disk in the disk chucking device embodying the present invention.

With the aforementioned configuration, when a disk D is installed in the chucking device 120S, each of the L-shaped elastic pieces 192 of the plate spring member 191 is in opposed contact with the inner surface of the corresponding clamping member 161S, as illustrated in FIG. 2A, and is pushed clockwise (namely, in the direction of an arrow X shown in this figure). The pin 163 of each of the clamping members 161 abuts against the inner surface 135 of the side edge portion of the corresponding opening 132 of the center boss 131C. The chuck end portion 162 of each of the clamping members 161 is partly exposed in the direction of the outer circumference of the turntable 121S from the corresponding opening 132 of the center boss 131C.

Furthermore, the hinge member 181 is downwardly pushed by the resilient force of the compression coil spring 184 and thus is in opposed contact with the largest-diameter top surface of the cylinder 123. Each of the clamping members 161 having the supporting shaft 163 held by a corresponding one of the U-shaped holding portions 183 of the hinge member 181 is downwardly pressed by the pressing force of the spring 184. The top surface of each of the clamping members 161 is placed under the top surface of the center boss 131C.

Incidentally, in FIGS. 2A to 3D, the supporting shafts 163 of the clamping members 161 are denoted by the mark "+" representing the center of rotation, and the pins 164 are designated by the mark "×" indicating that the pins 164 are rotatable, similarly as in FIGS. 8A to 9C described previously.

Figure 2B:
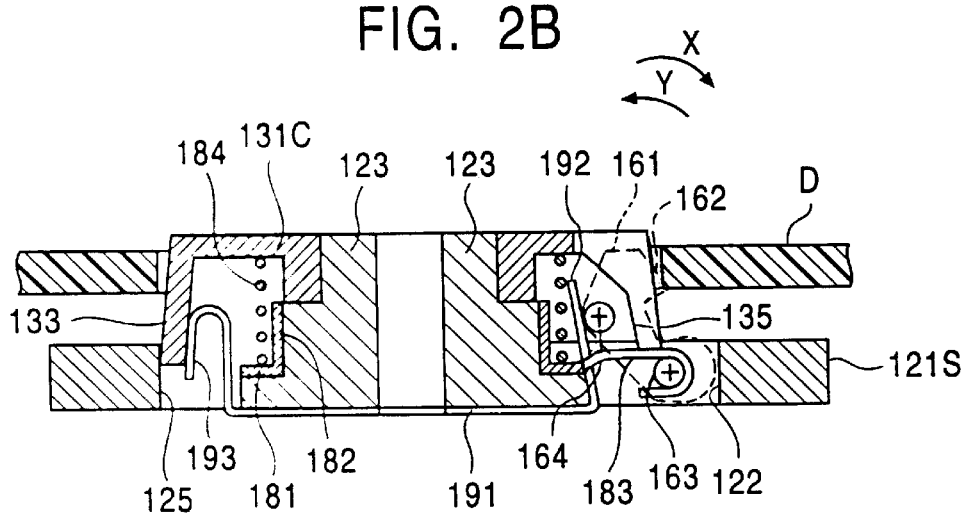

As illustrated in FIG. 2B, when the disk D is installed in this device, the top surface 162A of the chuck end portion 162 of each of the clamping members 161 is pushed by the inner edge of the disk D in the direction of the inner circumference of the turntable 121S during the descent of the disk D. Each of the clamping members 161 is rotated counterclockwise (namely, in the direction of an arrow Y shown in FIG. 2B). Thus, each of the pins 164 is detached from the inner surface 135 of the corresponding opening 132 of the center boss 131C. Moreover, each of the L-shaped elastic pieces 192 of the plate spring member 191 is pushed anticlockwise (namely, in the direction of the arrow Y shown in FIG. 2B).

In the state of the device illustrated in FIG. 2B, the hinge member 181 remains pushed downwardly by the resilient force of the compression coil spring 184 and is in opposed contact with the top surface of the largest-diameter portion of the cylinder 123.

This state lasts until the disk D descends still more to a position where the inner edge of the top surface thereof surmounts the edge of the chuck end portion 62 of each of the clamping members 61.

Figure 2C:
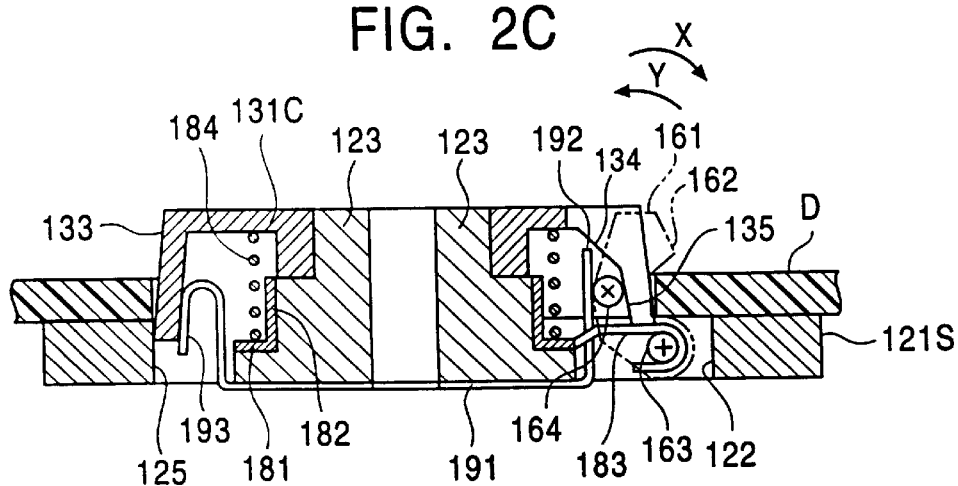

Then, in the state in which the disk D descends still more to a position where the disk D is put on the turntable 121S as illustrated in FIG. 2C, the top surface of the inner edge of the disk D abuts against the bottom surface 162B of the chuck end portion 162 of each of the clamping members 161.

In the situation illustrated in FIG. 2C, the chucking device 120S returns to nearly the same state as illustrated in FIG. 2A except the position of the disk D.

Namely, the pin 164 of each of the clamping members 161 is pushed clockwise (that is, in the direction of the arrow X) by the corresponding L-shaped elastic piece 192 of the plate spring member 191 and abuts against the inner surface 135 of the side edge portion of the corresponding opening 132 of the center boss 131C.

Furthermore, the supporting shafts 163 of the clamping members 161 are pushed downwardly by the resilient force of the compression coil spring 184 through the U-shaped holding portions 183 of the hinge member 181. The bottom surface 162B of the chuck end portion 162 of each of the clamping members 161 abuts against the inner edge of the disk D from above. Thus, the disk D is pressed and clamped. In other words, the disk D is put between the turntable 121S and each of the chuck end portions 162 of the clamping members 161, and is thus chucked.

Therefore, in the case of the chucking device 120S of this embodiment, the pressing forces exerted by the clamping members 161 at the time of installing a disk are stably ensured by setting the resilient force of the compression coil spring 184.

Moreover, each of the supporting shafts 163 of the clamping members 161 is held by the corresponding U-shaped holding portions 183 of the hinge member 181 which can slide upwardly and downwardly along the cylinder 123 serving as a guide axis of sliding motion. Consequently, even when, for instance, a mechanical shock causes the disk D to move in the direction in which the chuck end portion 162 of each of the clamping members 161 engages therewith, the chuck end portion 162 thereof rises with the result that the pressing force against the disk D is constant.

Further, all of the clamping members 161 and the compression coil spring 184 are placed above the turntable 121. Thus, the height of the entire device is reduced. Consequently, a slim device is realized.

Furthermore, the structures of the clamping members 161, the hinge member 181 and the plate spring member 191 are relatively simple. Thus, the cost of components and the number of man-hours to fabricate the device are decreased.

Additionally, in the case of this embodiment, the distance from the supporting shaft 163 of each of the clamping members 161 to the center of the turntable 121S is set as being nearly equal to the radius of the central hole of the disk D. Thus, the supporting shaft 163 of each of the clamping members 161 is placed just under the point of contact between the disk D and the chuck end portion 162 of the corresponding clamping member 161. Consequently, the pressing forces of the clamping members 161 against the disk D are ensured. Moreover, the resilient forces of the Lshaped elastic pieces 192 of the plate spring member 191 are decreased.

Incidentally, as illustrated in FIG. 2C, the chuck end portion 162 of each of the clamping members 161 is exposed in the direction of the outer circumference of the turntable 121S from the corresponding opening 132 of the center boss 131C even when the disk D is chucked.

Figure 4A:
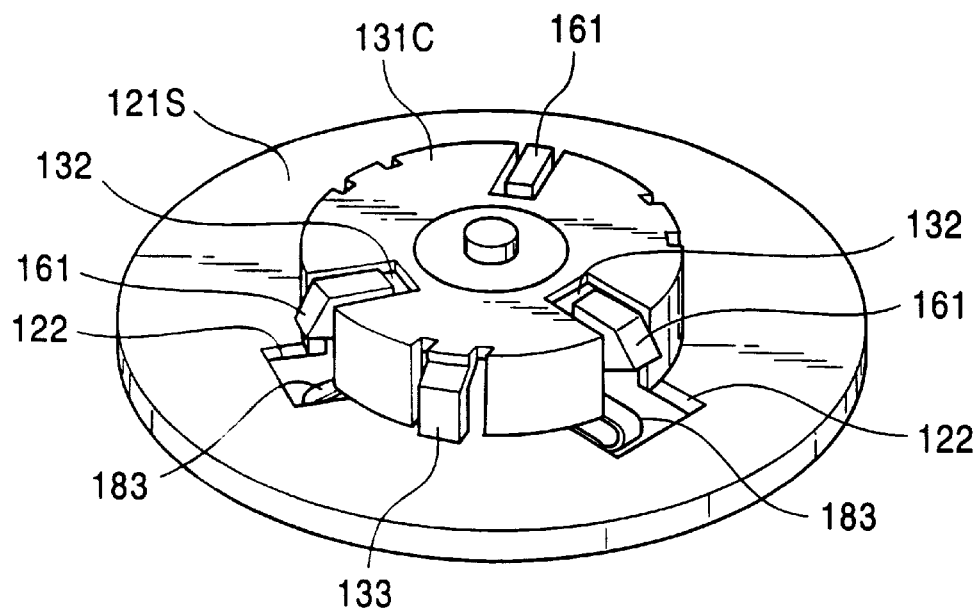
FIGS. 4A and 4B are conceptual diagrams illustrating a chucking mechanism of the disk chucking device embodying the present invention.
Figure 4B:
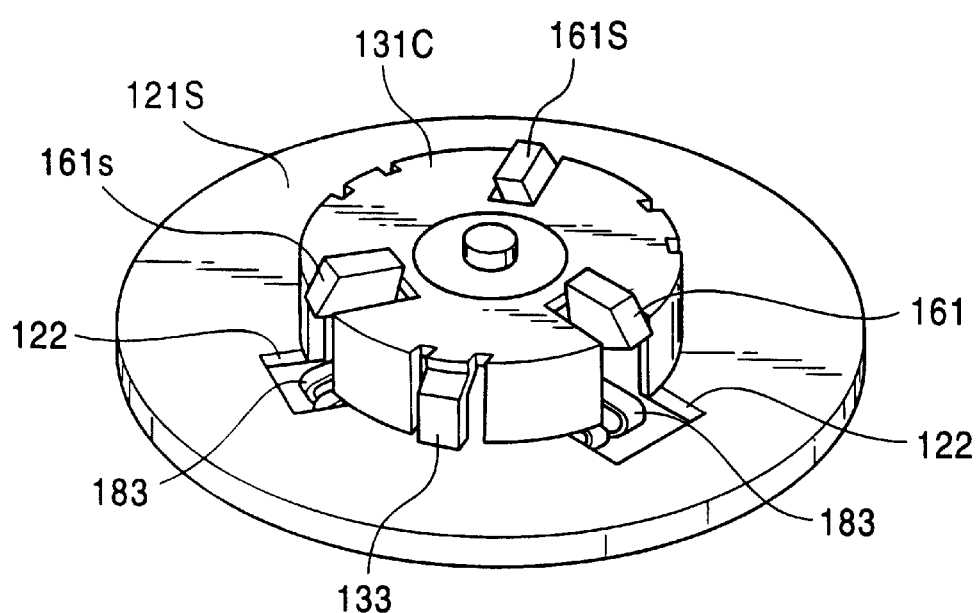
Figure 5:
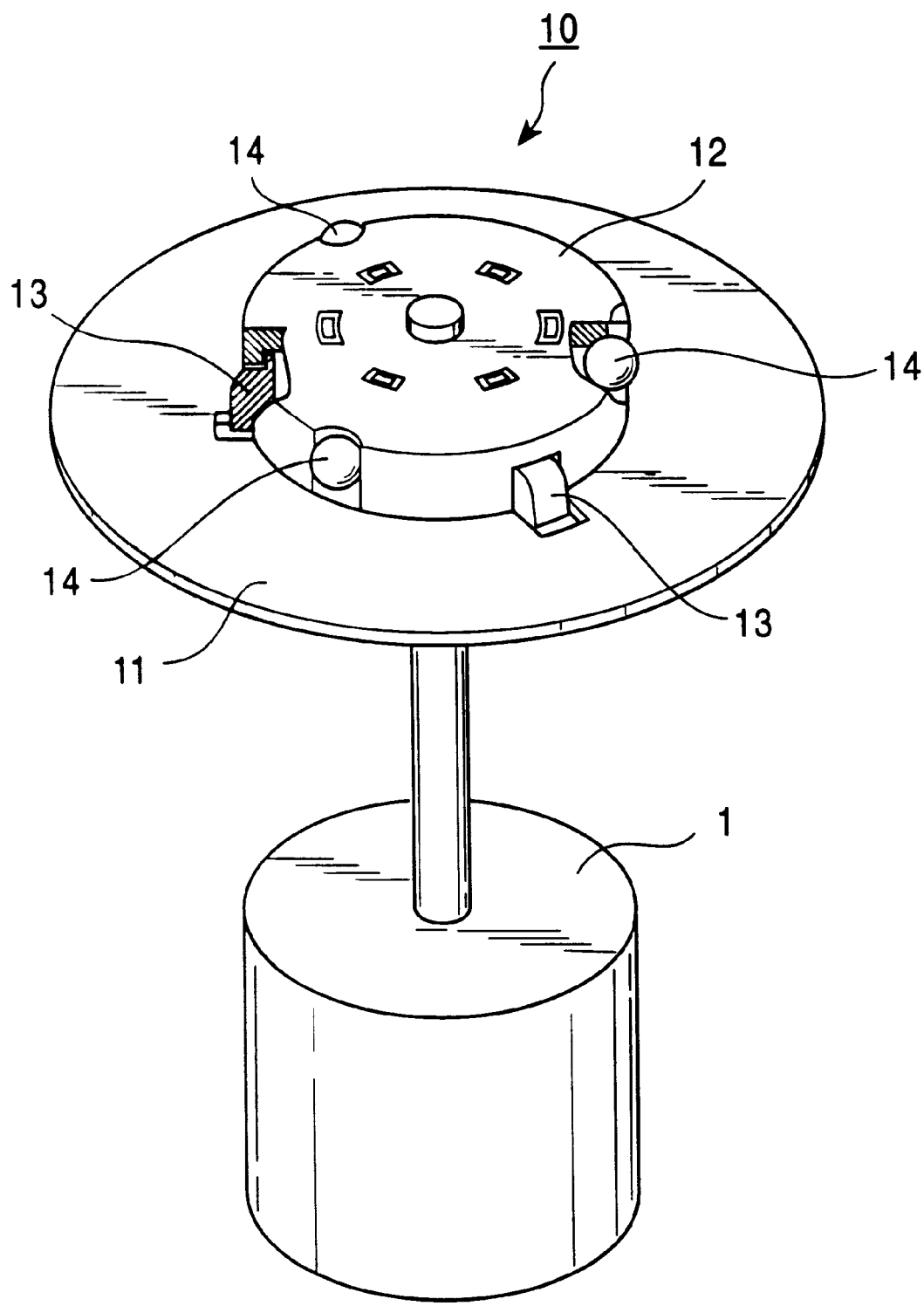
FIG. 5 is a perspective diagram showing the configuration of a conventional disk chucking device.
Figure 6A:
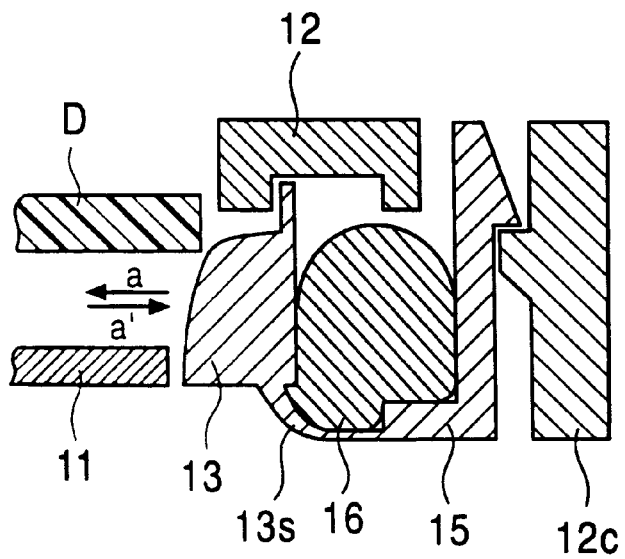
FIGS. 6A and 6B are sectional diagrams illustrating a chucking operation of the conventional disk chucking device.
Figure 6B:
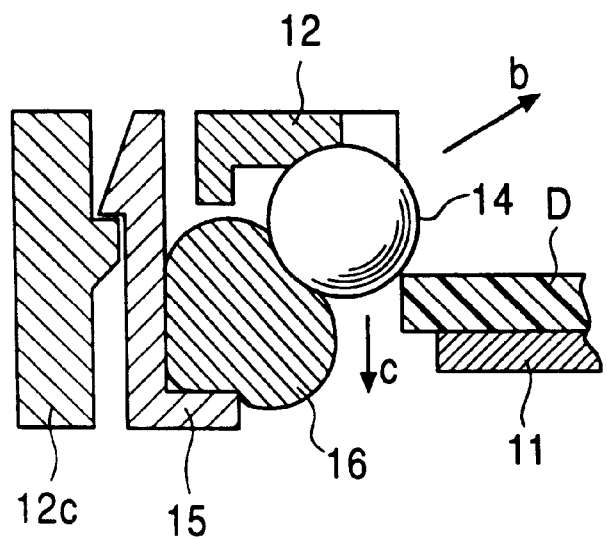
Figure 7:
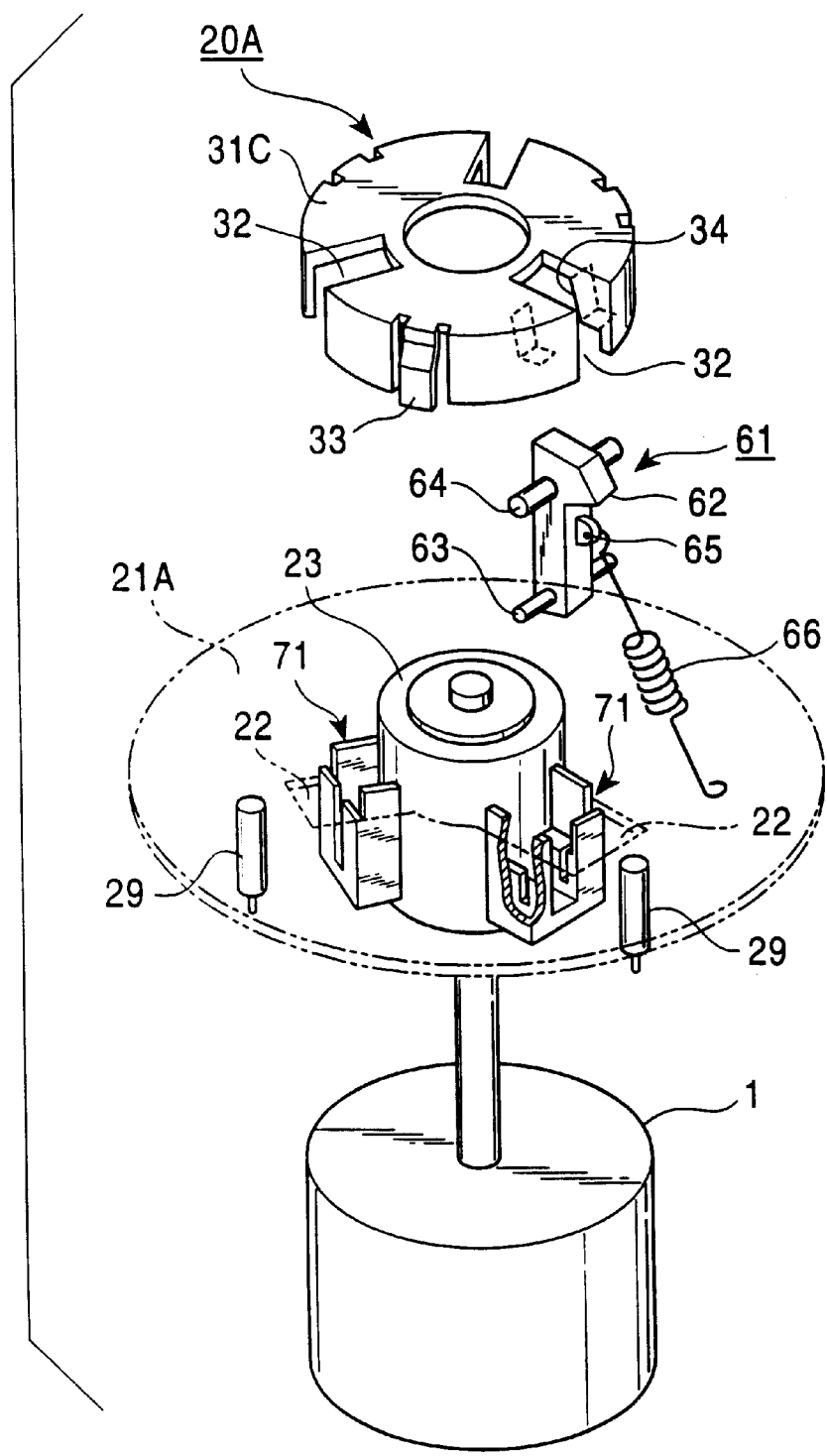
FIG. 7 is a perspective diagram showing the configuration of the proposed disk chucking device.
Figure 8A:
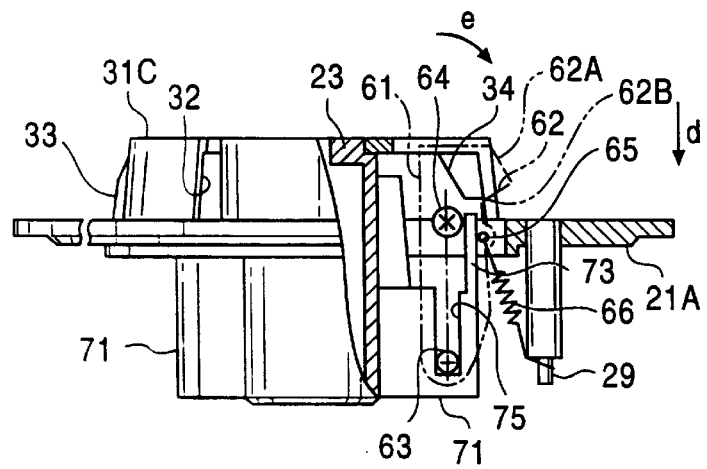
FIGS. 8A to 8C are sectional diagrams illustrating an operation of installing a disk in the proposed disk chucking device.
Figure 8B:
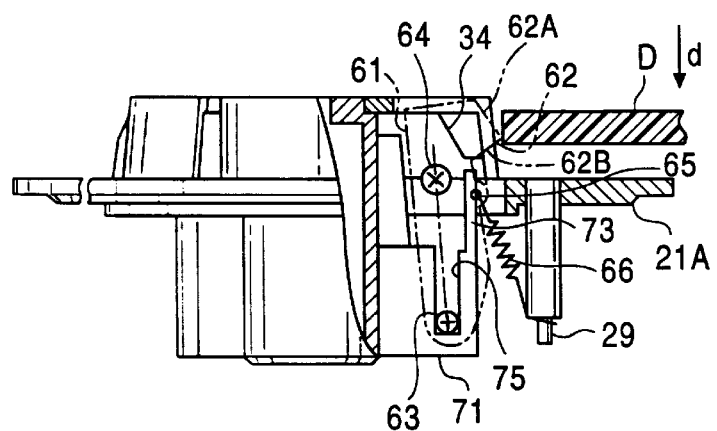
Figure 8C:
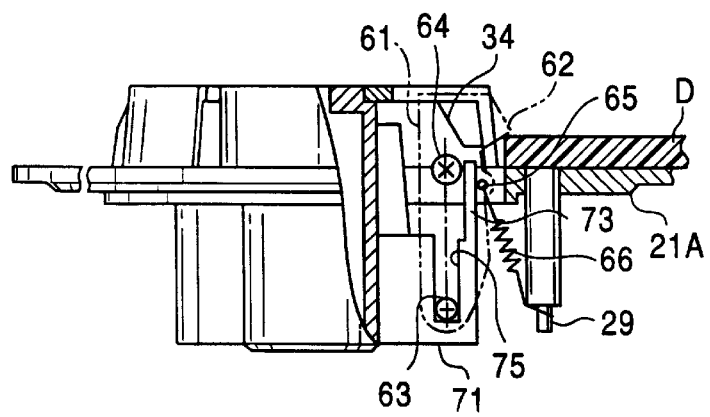
Figure 9A:
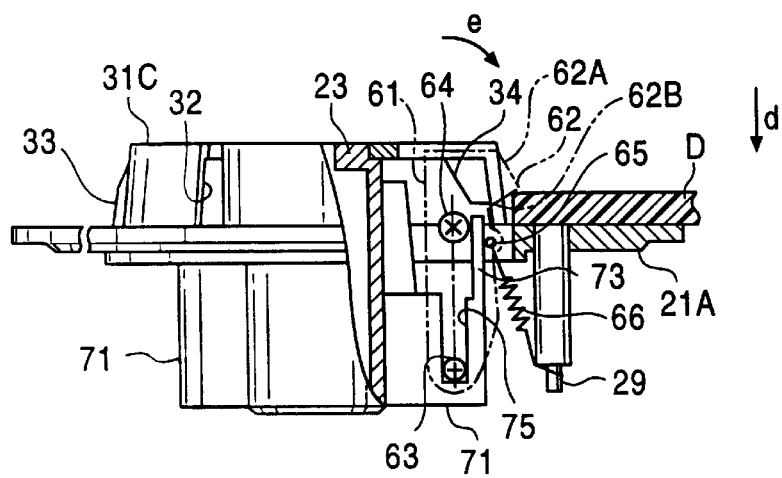
FIGS. 9A to 9C are sectional diagrams illustrating an operation of detaching a disk from the proposed disk chucking device.
Figure 9B:
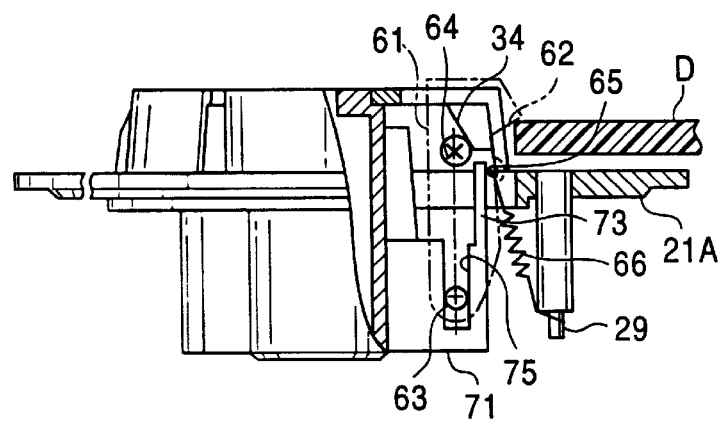
Figure 9C:
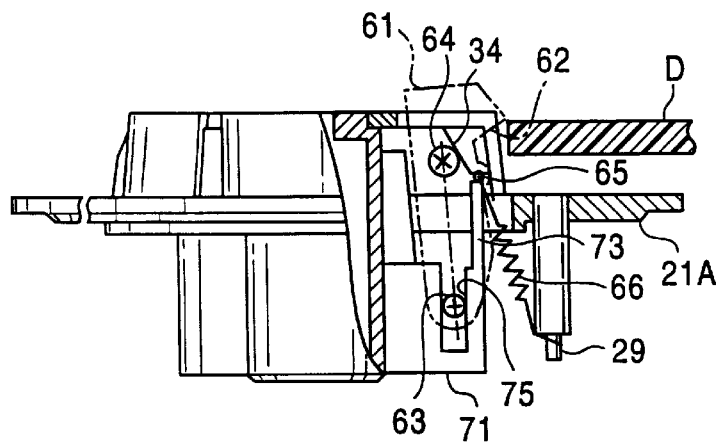

Further, the top portions of the clamping members 161 are placed under the top surface of the center boss 131C. In FIGS. 4A and 4B, the disk is not shown, for ready understanding.

Figure 3A:
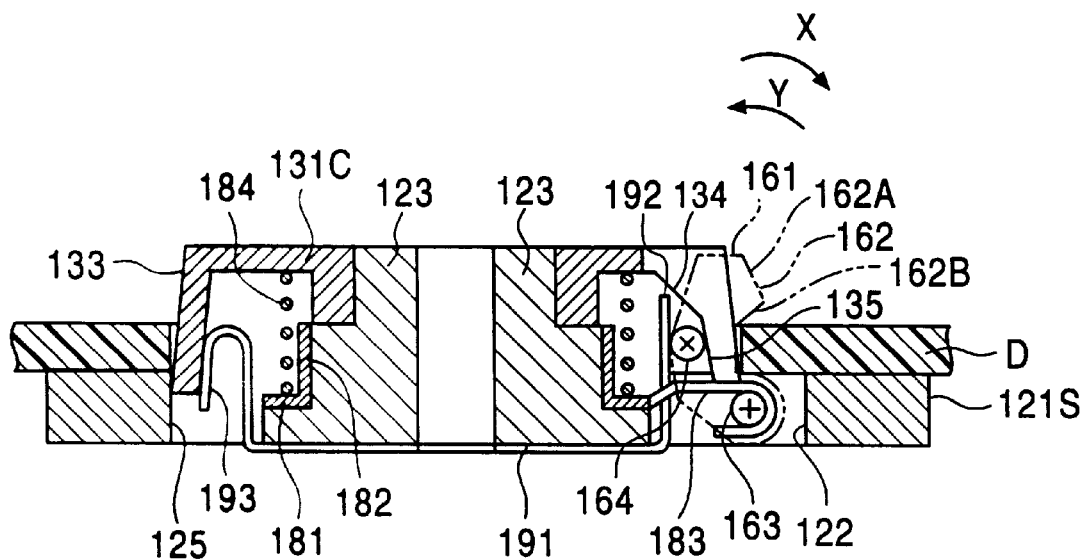
FIGS. 3A to 3D are sectional diagrams illustrating an operation of detaching the disk from the disk chucking device embodying the present invention.
Figure 3B:
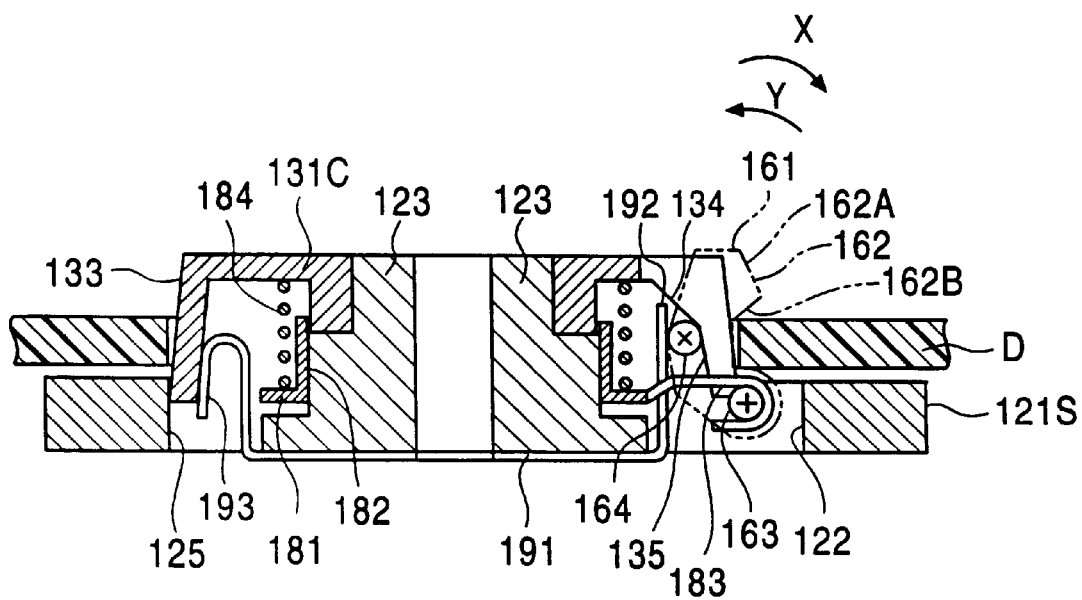

When the disk D is detached from the device in which the disk D is chucked as illustrated in FIGS. 2C and 3A, the bottom surface 162B of the chuck end portion 162 of each of the clamping members 161 is upwardly pushed by the inner edge of the top surface of the disk D during the descent thereof.

Then, with the upward displacement of the clamping members 161, the supporting shafts 163 thereof are displaced in the direction of the axis of the cylinder 123 while being respectively held in the holding portions 183 of the hinge member 181. Moreover, the pins 164 of the clamping members 161 are upwardly displaced while sliding along the inner surfaces of the side edge portions of the openings of the center boss 131C.

Incidentally, as a result of the fact that the holding portions 183 of the hinge member 181 are upwardly placed, the coil spring 184 is compressed still more.

Figure 3C:
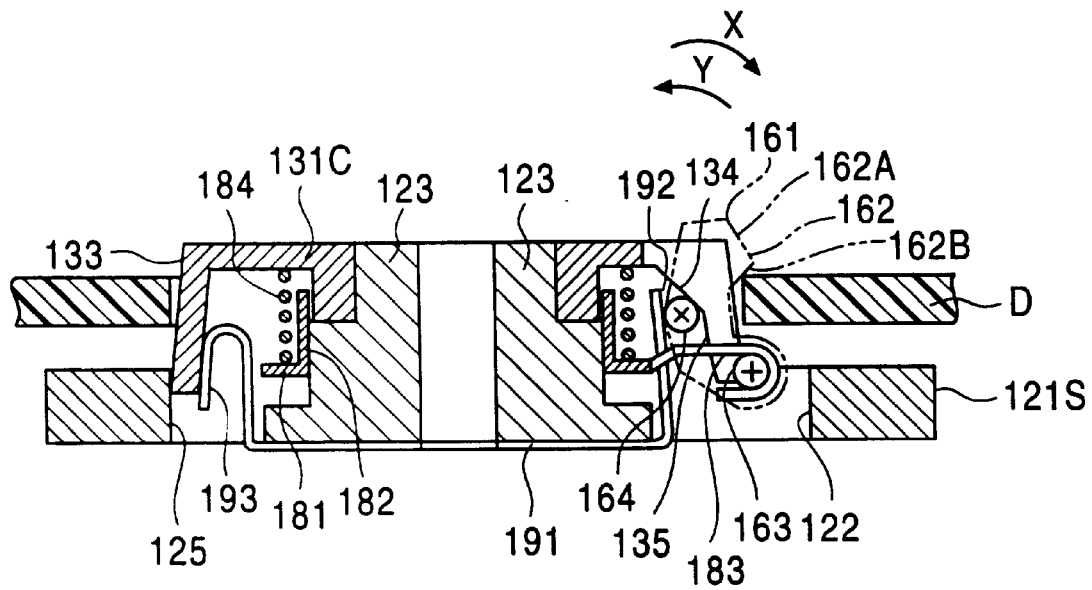

Subsequently, the pins 164 of the clamping members 161 are detached from the inner surfaces 135 of the side edge portions of the openings of the center boss 131C and come to slide on the inner slopes of the cams 134 of the center boss 132, as illustrated in FIG. 3C. Thus, the coil spring 184 is compressed still more, and each of the clamping members 161 rotates counterclockwise (namely, in the direction of the arrow Y).

Figure 3D:
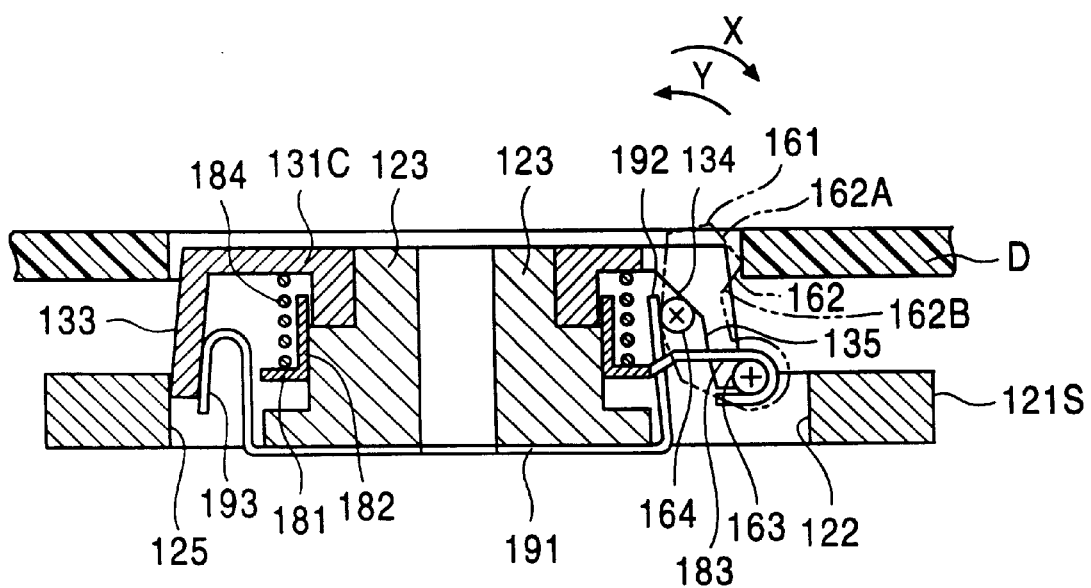

The amount of rotation of each of the clamping members 161 reaches a maximum value when the disk D ascends still more and the inner edge of the top surface of the disk D surmounts the edges of the chuck end portions of the clamping members 161 as illustrated in FIG. 3D.

In the state illustrated in FIGS. 3C and 3D, the top portions of the clamping members 161 are upwardly exposed from the openings 132 of the center boss 131C as shown in FIG. 4B. Incidentally, in FIG. 4B, the disk is not shown, for ready understanding.

When the disk D ascends still more from the position shown in FIG. 3D to a position where the bottom surface of the disk D abuts against the top surface 162A of the chuck end portion 162 of each of the clamping members 161, the engagement of the disk D with this chuck end portion 162 is canceled.

Then, as the hinge member 181 pushed by the resilient force of the compression coil spring 184 returns downwardly to the initial position, the clamping members 161 having the supporting shafts 163 respectively held in the holding portions 183 are downwardly displaced. Moreover, the pin 164 of each of the clamping members 161 is pressed clockwise by the corresponding L-shaped elastic piece 192 of the plate spring member 191 and thus abuts against the inner surface 135 of the corresponding opening of the center boss 131 again. Consequently, the device automatically returns to the state where no disk is installed as illustrated in FIG. 2A.

As described above, according to the present invention, the pressing forces of the clamping members can be stably ensured. Moreover, the device can be reduced in thickness.

Furthermore, according to an embodiment of the present invention, the elastic force of the first elastic piece of the plate spring member can be decreased.

Although the preferred embodiment of the present invention has been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. A disk player having a disk chucking device, comprising:
   a turntable onto which a disk is placed;
   a centering member connected to a shaft member attached to a top surface of said turntable and adapted to engage a central hole of said disk;
   a plurality of clamping members, disposed on an intervening portion between outer and inner edges of said turntable at a predetermined angular interval, for pushing against said turntable an inner edge portion of said disk surrounding said central hole;
   a cam member provided above each of said plurality of clamping members so that the cam member is in opposed contact with a corresponding clamping member when the disk is detached from the disk chucking device;
   spring means for pushing said plurality of clamping members in a downward direction and in a direction of an outer circumference of said disk; and
   holding means for holding said plurality of clamping members so that the plurality of clamping members are slidably engaged in a direction perpendicular to a surface of said turntable and swingably engaged in a direction of a radius of said turntable,
   wherein a projection portion having inclined upper and lower surfaces is formed at a the top portion of each of said plurality of clamping members so that the projection portion projects in the direction of the outer circumference of said disk so that said inner edge portion surrounding the central hole is pushed by the inclined lower surface,
   wherein an opposed contact portion is formed at an upper portion of each of said plurality of clamping members so that the opposed contact portion is in opposed contact with both [of] said cam member and said centering member;
   wherein a supporting shaft to be held by said holding member is provided at a lower portion of each of said plurality of clamping members, and
   wherein a cylindrical portion is formed in a central portion of said holding means so that the cylindrical portion is slidably engaged on said shaft member.

2. The disk player according to claim 1, wherein a distance between said supporting shaft of each of said plurality of clamping members and an axis of said turntable is set as being nearly equal to a radius of the central hole of said disk in said disk chucking device.

3. The disk player according to claim 1, wherein said spring means has a first spring member for downwardly pushing each of said plurality of clamping members and a second spring member for pushing each of said plurality of clamping members in the direction of the outer circumference of said disk,
   wherein said first spring member is intervened between said centering member and said holding [member] means, and
   wherein said plurality of clamping members are pushed in the direction of the outer circumference of said disk by a plurality of elastic pieces formed on an edge portion of said second spring member.

4. The disk player according to claim 3, wherein said first spring member is a compression coil spring.

5. The disk player according to claim 3, wherein said second spring member is a plate spring.

6. The disk player according to claim 1, wherein said plurality of clamping members are disposed on said intervening portion of said turntable at an angular interval of 120 decrees.

7. The disk player according to claim 1, wherein each of said plurality of clamping members pushes said inner edge portion surrounding the central hole of said disk by the inclined upper and lower surfaces provided on said projection portion and by a pressing force having a first component for pressing said inner edge portion surrounding the central hole against said turntable and a second component for pressing said inner edge portion surrounding the central hole in a direction of the radius of said disk.

8. The disk player according to claim 1, wherein, as the disk is displaced in a direction in which said disk moves away from said turntable, said plurality of clamping members slide in the direction perpendicular to the surface of said turntable as a displacement of [a] the disk placed on said turntable occurs.

9. The disk player according to claim 1, wherein, when said plurality of clamping members slide in the direction perpendicular to the surface of said turntable, said cam members guide said plurality of clamping members that swing in a direction of the radius of said turntable against a resilient force of said spring means.

10. The disk player according to claim 1, wherein said centering member, said spring means, said holding means and said turntable are arranged coaxially with each other.

11. A disk player having a disk chucking device, comprising:

a turntable onto which a disk is placed;

a centering member connected to a shaft member attached to a top surface of said turntable and adapted to engage a central hole of said disk;

a plurality of clamping members, disposed on an intervening portion between outer and inner edges of said turntable at a predetermined angular interval, for pushing against said turntable an inner edge portion of said disk surrounding said central hole;

a cam member provided above each of said plurality of clamping members so that the cam member is in opposed contact with a corresponding clamping member when the disk is detached from the disk chucking device;

spring means for pushing said plurality of clamping members in a downward direction and in a direction of an outer circumference of said disk; and holding means for holding said plurality of clamping members so that the plurality of clamping members are slidably engaged in a direction perpendicular to a surface of said turntable and swingably engaged in a direction of a radius of said turntable, wherein a projection portion having inclined upper and lower surfaces is formed at a top portion of each of said plurality of clamping members so that the projection portion projects in the direction of the outer circumference of said disk so that said inner edge portion surrounding the central hole is pushed by the inclined lower surface, wherein an opposed contact portion is formed at an upper portion of each of said plurality of clamping members so that the opposed contact portion is in opposed contact with both said cam member and said centering member, and wherein a cylindrical portion is formed in a central portion of said holding means so that the cylindrical portion is slidably engaged on said shaft member.

12. The disk player according to claim 11, wherein said spring means has a first spring member for downwardly pushing each of said plurality of clamping members and a second spring member for pushing each of said plurality of clamping members in the direction of the outer circumference of said disk, wherein said first spring member is intervened between said centering member and said holding [member] means, and wherein said plurality of clamping members are pushed in the direction of the outer circumference of said disk by a plurality of elastic pieces formed on an edge portion of said second spring member.

13. The disk player according to claim 12, wherein said first spring member is a compression coil spring.

14. The disk player according to claim 12, wherein said second spring member is a plate spring.

15. The disk player according to claim 11, wherein said plurality of clamping members are disposed on said intervening portion of said turntable at an angular interval of 120 degrees.

16. The disk player according to claim 11, wherein each of said plurality of clamping members pushes said inner edge portion surrounding the central hole of said disk by the inclined upper and lower surfaces provided on said projection portion and by a pressing force having a first component for pressing said inner edge portion surrounding the central hole against said turntable and a second component for pressing said inner edge portion surrounding the central hole in a direction of the radius of said disk.

17. The disk player according to claim 11, wherein, as the disk is displaced in a direction in which said disk moves away from said turntable, said plurality of clamping members slide in the direction perpendicular to the surface of said turntable as a displacement of the disk placed on said turntable occurs.

18. The disk player according to claim 11, wherein, when said plurality of clamping members slide in the direction perpendicular to the surface of said turntable, said cam members guide said plurality of clamping members that swing in a direction of the radius of said turntable against a resilient force of said spring means.

19. The disk player according to claim 11, wherein said centering member, said spring means, said holding means and said turntable are arranged coaxially with each other.

* * * * *